(12) United States Patent
Yun (10) Patent No.: US 11,473,348 B2
(45) Date of Patent: Oct. 18, 2022

(54) INTEGRATED DOOR LATCH ASSEMBLY OF SLIDING DOOR

(71) Applicants: Hyundai Motor Company, Seoul (KR); Kia Motors Corporation, Seoul (KR)

(72) Inventor: Hyung-In Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 950 days.

(21) Appl. No.: 16/212,406

(22) Filed: Dec. 6, 2018

(65) Prior Publication Data
US 2019/0390489 A1    Dec. 26, 2019

(30) Foreign Application Priority Data

Jun. 26, 2018  (KR) ........................ 10-2018-0073556

(51) Int. Cl.
*E05B 83/40*     (2014.01)
*E05C 17/60*     (2006.01)
(Continued)

(52) U.S. Cl.
CPC .................. *E05B 83/40* (2013.01); *B60J 5/06* (2013.01); *E05B 79/20* (2013.01); *E05C 17/60* (2013.01)

(58) Field of Classification Search
CPC .......... E05B 83/40; E05B 83/44; E05B 83/04; E05B 85/20; E05B 85/24; E05B 85/243;
(Continued)

(56) References Cited

U.S. PATENT DOCUMENTS 4,457,146 A * 7/1984 Weinerman ......... E05B 65/0811
292/216
5,573,287 A * 11/1996 Takimoto ............ E05B 65/0811
292/106
(Continued)

FOREIGN PATENT DOCUMENTS

DE       2263421 A  *  7/1974
GB        241130 A  * 10/1925 .......... E05B 65/0811
(Continued)

OTHER PUBLICATIONS

Chinese National Intellectual Property Administration, Office Action in Application No. 2019103447791, dated Jul. 14, 2021, 16 pages.

*Primary Examiner* — Alyson M Merlino
(74) *Attorney, Agent, or Firm* — Slater Matsil, LLP (57) ABSTRACT

An integrated door latch assembly of a sliding door may include a plate installed at the lower front of the sliding door, a front latch part which is installed in the front of the plate, and a hold open latch part which is installed at the plate so as to be spaced apart from the front latch part to the rear of the vehicle. The front latch part maintains the closed state of the sliding door by restraining a close striker formed at a vehicle body when the sliding door is closed and releases the restriction of the close striker when the sliding door starts to open. The hold open latch part maintains the open state by restraining the sliding of the sliding door when the sliding door is opened and releases the restriction so that the sliding door can slide.

11 Claims, 8 Drawing Sheets

(51) Int. Cl.
 *E05B 79/20* (2014.01)
 *B60J 5/06* (2006.01)
(58) Field of Classification Search
 CPC ........ E05B 85/247; E05B 85/26; E05B 65/08;
 E05B 65/0811; E05B 65/0823; E05B
 65/0835; E05B 79/02; E05B 79/10; E05B
 79/20; E05C 17/60; Y10T 292/081; Y10T
 292/0825; Y10T 292/0826; Y10T
 292/083; Y10T 292/0831; Y10T
 292/0848; Y10T 292/0849; Y10T
 292/0855; Y10T 292/0857; Y10T
 292/1047; Y10T 292/1057; Y10T
 292/1078; Y10T 292/1082; Y10S 292/03;
 Y10S 292/06; Y10S 292/17; Y10S
 292/19; Y10S 292/23; Y10S 292/25;
 Y10S 292/46; Y10S 292/53
 See application file for complete search history.

(56) References Cited

U.S. PATENT DOCUMENTS 5,979,951 A * 11/1999 Shimura ............... E05B 83/40
 292/216

6,412,222 B1 * 7/2002 Hashiba ................. B60J 5/06
 296/155
7,222,459 B2 5/2007 Taniyama
2006/0254145 A1 11/2006 Langfermann et al.
2009/0267359 A1 10/2009 Takayanagi et al.

FOREIGN PATENT DOCUMENTS

| JP | H11107606 A | | 4/1999 |
|----|-------------|---|--------|
| JP | 2004293038 A | | 10/2004 |
| JP | 2006176983 A | | 7/2006 |
| JP | 2007177456 A | | 7/2007 |
| JP | 2008240393 A | | 10/2008 |
| JP | 2009264004 A | | 11/2009 |
| KR | 20030049527 A | * | 6/2003 |
| KR | 200376542 Y1 | * | 3/2005 |
| KR | 20050082578 A | | 8/2005 |
| KR | 100770521 B1 | * | 10/2007 |
| KR | 20070096435 A | * | 10/2007 |
| KR | 100788095 B1 | | 12/2007 |
| KR | 101220394 B1 | * | 1/2013 |
| KR | 101382121 B1 | | 4/2014 |

* cited by examiner

INTEGRATED DOOR LATCH ASSEMBLY OF SLIDING DOOR

CROSS-REFERENCE TO RELATED APPLICATIONS

This application claims priority to Korean Patent Application No. 10-2018-0073556, filed on Jun. 26, 2018, which application is hereby incorporated herein by reference.

TECHNICAL FIELD

The present disclosure relates to a door latch assembly applied to a sliding door of a vehicle.

BACKGROUND

There are several types of doors that allow passengers to get into or out of the interior of a vehicle.

Figure 1:
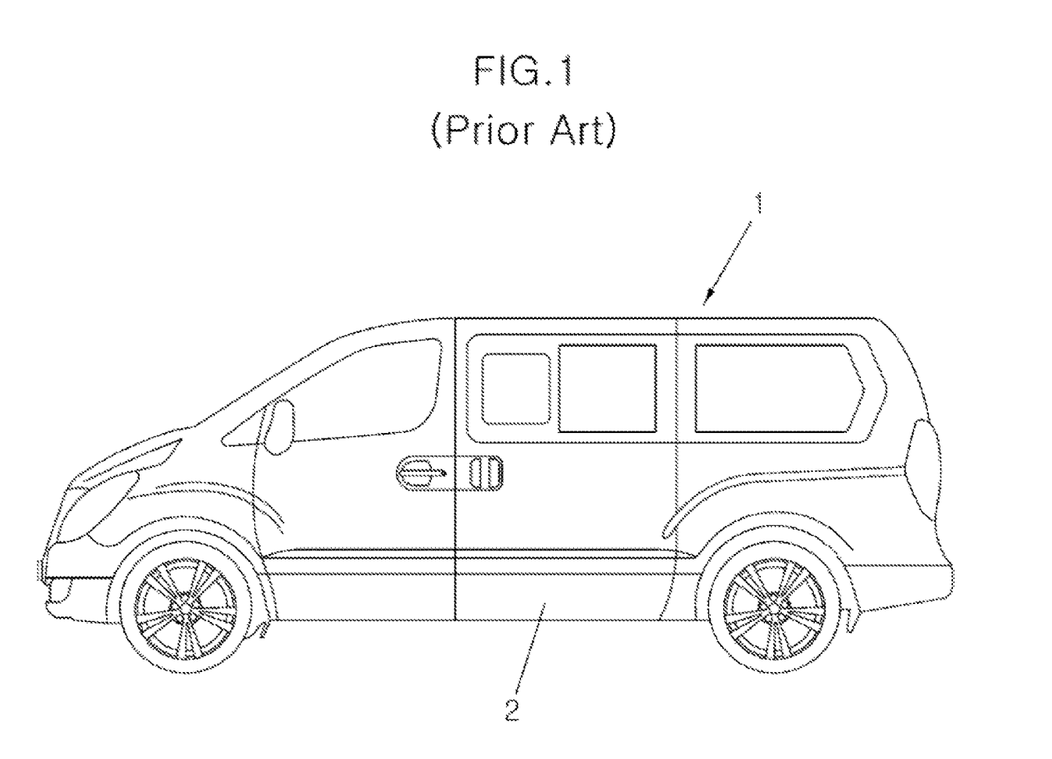
FIG. 1 is a side view showing a state in which a sliding door is applied to a van.

As shown in FIG. 1, in a vehicle 1 such as a van or the like, a sliding door 2 that is opened and closed along the side of the vehicle is applied.

Figure 2:
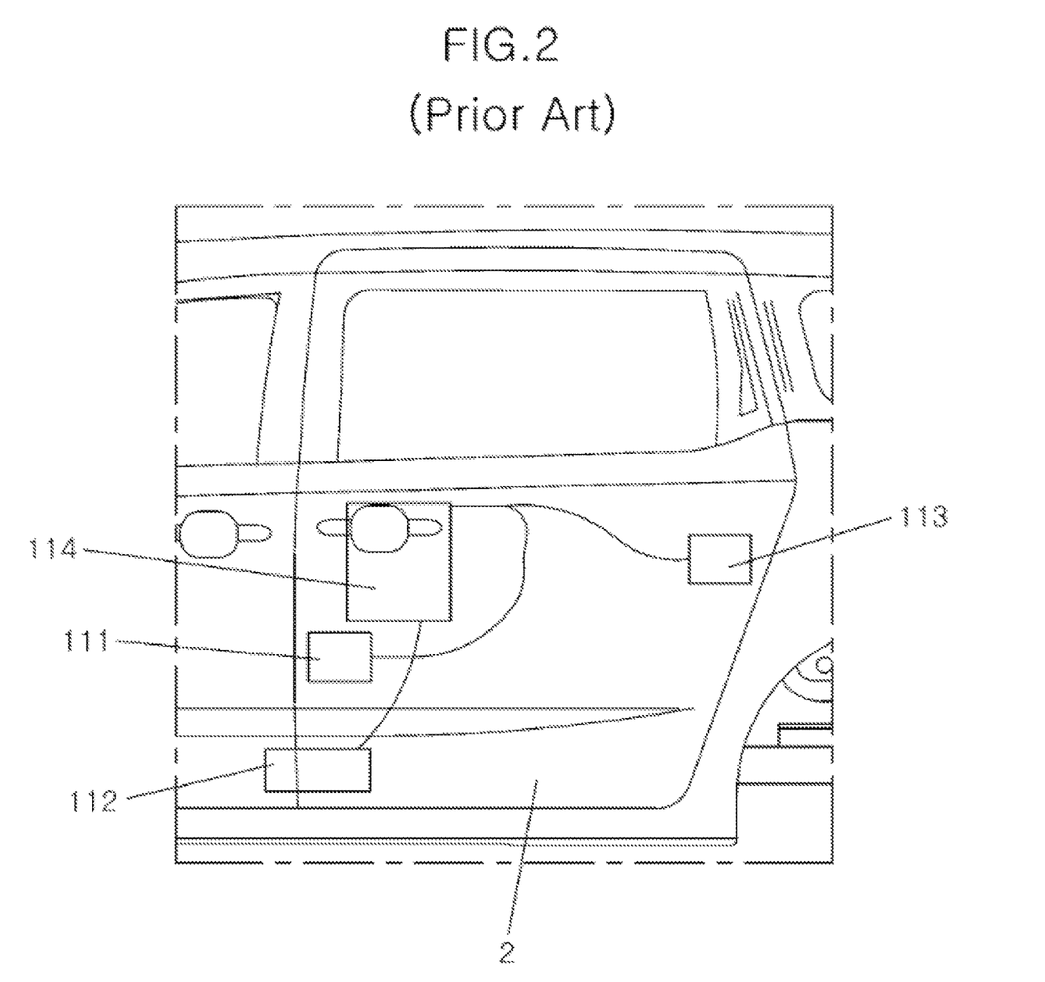
FIG. 2 is a side view showing a state in which a front latch, a rear latch and a hold open latch are installed on a sliding door according to a conventional art.

A front latch 111 and a rear latch 113 for closing the sliding door 2 are respectively installed at the front and rear ends of the sliding door 2, respectively. The front latch 111 and the rear latch 113 are kept closed when the door is closed and make the front and rear ends of the sliding door 2 to be engaged with the vehicle body of the vehicle 1, thereby meeting the regulation of strength of the part where the sliding door 2 is installed in case of side collision.

Also, in order to keep the sliding door 2 open at the front of the sliding door 2, a hold open latch 112 is installed at the front end of the sliding door 2. When the sliding door 2 is fully opened, the hold open latch 112 keeps the sliding door 2 open so that the occupant can get on or off easily.

Meanwhile, the front latch 111, the rear latch 113, and the hold open latch 112 are connected to a remote controller 114 with a cable, which are operated when an inside handle and an outside handle are operated, respectively, inside and outside the sliding door 2. When the inside handle and the outside handle are manipulated, the cable is pulled by the remote controller 114 to activate the front latch 111, the rear latch 113 and the hold open latch 112.

However, the door latch according to the conventional art has a problem that the weight of the sliding door 2 are increased by applying the front latch 111, the rear latch 113 and the hold open latch 112 of weight to the sliding door 2.

In addition, the installation of the front latch 111 makes it difficult to assemble the panel of the sliding door 2 and to set the glass up and down layout of the sliding door 2.

The foregoing is intended merely to aid in the understanding of the background of the present disclosure, and is not intended to mean that the present disclosure falls within the purview of the related art that is already known to those skilled in the art.

SUMMARY

Embodiments of the present disclosure relate to a door latch assembly applied to a sliding door of a vehicle. Particular embodiments relate to an integrated door latch assembly of a sliding door in which a front door latch maintaining a close state of a door and a hold open latch maintaining an open state of the door are integrally formed.

Embodiments of the present disclosure can solve above problems and provide an integrated door latch assembly of a sliding door capable of reducing the number of latches mounted on the sliding door and performing the function of close maintaining or open maintaining of the sliding door by integrating a front latch and a hold open latch in a sliding door of a vehicle.

An integrated door latch assembly of a sliding door according to embodiments of the present disclosure, which is mounted on a sliding door slidably installed on the side surface of a vehicle to maintain the open state or close state of the sliding door, may include a plate installed at the lower front of the sliding door. A front latch part, which is installed in the front of the plate, maintains the closed state of the sliding door by restraining a close striker formed at a vehicle body when the sliding door is closed and releases the restriction of the close striker when the sliding door starts to open. A hold open latch part, which is installed at the plate so as to be spaced apart from the front latch part to the rear of the vehicle, maintains the open state by restraining the sliding of the sliding door when the sliding door is opened and releases the restriction so that the sliding of the sliding door is possible when the sliding door starts to close.

The plate may be fastened to the lower portion of the sliding door and installed at the upper surface parallel to the ground at a lower bracket formed to be bent from the sliding door to be parallel to the ground.

A cutout groove through which the close striker enters and exits may be formed on the plate.

The front latch part may include a close lever installed on the plate to be rotated when a close cable is pulled by the operation of the passenger; a close catch formed with a cutout groove of a "U"-shape in which the close striker can enter and exit, and installed to be rotatable on the plate. A close pole rotating the close catch when the close lever is rotated in order that the cutout groove of the close catch and the cutout groove of the plate are aligned.

The close lever may be elastically supported in an opposite direction rotated when the close cable is manipulated. The close catch may be elastically supported in a direction that cutout groove formed at the plate and the cutout groove formed at the close catch are aligned. The close pole may be elastically supported in a direction that blocks the rotation of the close catch.

The hold open latch part may include a hold open cam installed on the plate to be rotated when a hold open cable is pulled to close the opened sliding door. A hold open catch is installed to be rotatable on the plate and restrain a lower roller of the sliding door when the sliding door is opened. A hold open pole restrains the hold open catch when the sliding door is opened so that the hold open catch maintains the restraint state of the lower roller, and releases the restraint of the hold open catch when the sliding door starts to close and the hold open cam rotates.

The hold open pole may include a protrusion pin formed at one side of the hold open pole so as to contact with a cam profile formed at the hold open cam, and a stop protrusion which restrains one side of the hold open catch and releases the restraint of the hold open catch when the hold open pole rotates.

A stopper may be formed at the hold open catch to be protruded in the circumference direction of the hold open catch, the stop protrusion may restrain the rotation of the hold open catch when coupled to a stepped jaw formed between the end portion of the stopper and the hold open catch, and the restraint of the hold open catch may be released when the stop protrusion is separated from the stepped jaw.

The hold open cam may be elastically supported in an opposite direction rotating when the hold open cable is pulled, the hold open pole may be elastically supported to be closely contacted with the hold open cam, and the hold open catch may be elastically supported in a direction that the lower roller is spaced apart from vehicle body.

In accordance with the integrated door latch assembly of the sliding door according to the present disclosure having the above-described configurations, by reducing the number of latches on the sliding door to two, the number of door latches of the weight is reduced, which reduces weight and cost.

In addition, since the door latch is not installed at the front latch portion of the sliding door, the degree of freedom of layout of the sliding door is increased and the assemble performance of the door glass installed at the sliding door is improved.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION OF ILLUSTRATIVE EMBODIMENTS

In order to better understand the present disclosure, preferred exemplary embodiments of the present disclosure will be explained with reference to the attached drawing. Exemplary embodiments of the present disclosure may be modified in various forms and the range of the present disclosure should not be construed as limited to the exemplary embodiments detailed below. The present exemplary embodiments are provided to more fully describe the present disclosure to those skilled in the art. Thus, the shape, and the like of an element in a drawing can be exaggerated to emphasize a clearer description. It should be noted that the same components in each drawing are denoted by the same reference numerals. Detailed descriptions of known features and configurations that may unnecessarily obscure the gist of the present disclosure are omitted.

Figure 3:
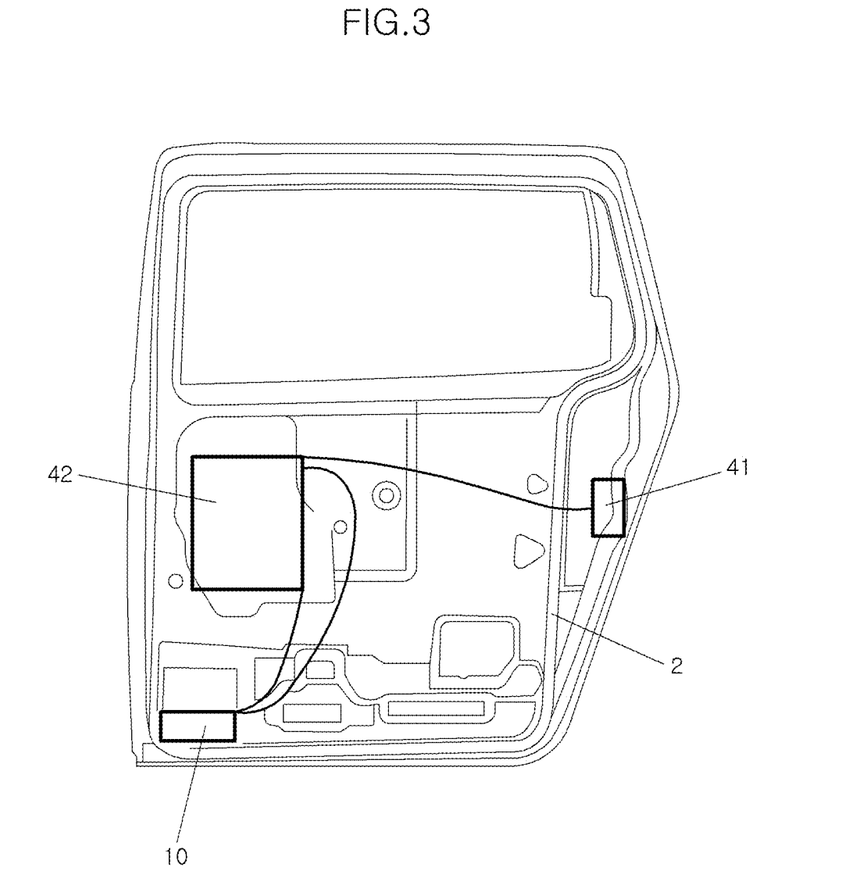
FIG. 3 is a side view showing a sliding door with an integrated door latch assembly of a sliding door according to the present disclosure.
Figure 4:
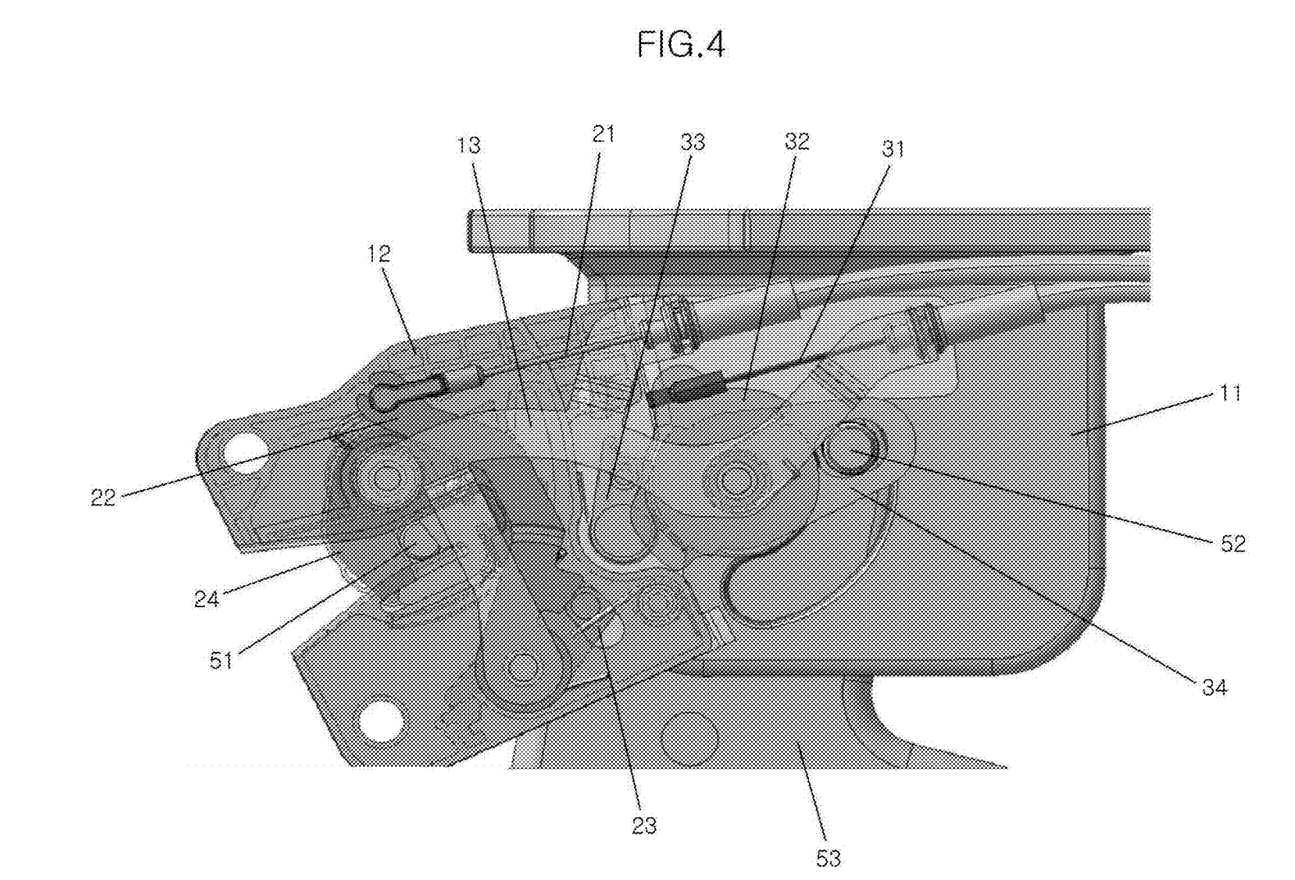
FIG. 4 is a plan view showing an integrated door latch assembly of a sliding door according to the present disclosure at the time of door closing.

An integrated door latch assembly of a sliding door according to the present disclosure, which is mounted on a sliding door 2 slidably mounted on the side surface of a vehicle 1 to maintain the open state or close state of the sliding door 2, may include a plate 12 installed at the lower front of the sliding door 2; a front latch part which is installed in the front of the plate 12, maintains the closed state of the sliding door 2 by restraining a close striker 51 formed at a vehicle body when the sliding door 2 is closed and releases the restriction of the close striker 51 when the sliding door 2 starts to open; and a hold open latch part which is installed at the plate 12 so as to be spaced apart from the front latch part to the rear of the vehicle, maintains the open state by restraining the sliding of the sliding door 2 when the sliding door 2 is opened and releases the restriction so that the sliding of the sliding door 2 is possible when the sliding door 2 starts to close.

The plate 12 may be mounted on a lower bracket 11 fixed to the sliding door 2. The lower bracket 11 may be installed at the lower portion of the sliding door 2 and bent so as to be parallel to the ground. The plate 12 may be mounted on the bent surface of the lower bracket 11, that is, the bent surface of the lower bracket 11 parallel to the ground, in particular, the upper surface of the bent surface. The present disclosure is such that the front latch part keeping the sliding door 2 closed when the sliding door 2 is closed and the hold open latch part keeping the sliding door 2 open, are installed on the plate 12 together. The front latch part and the hold latch open part are installed on the plate 12, so that it is possible to reduce the number of latches installed on the sliding door 2, thereby reducing installation space and weight. The plate 12 may be partially cut so that a cutout groove is formed to allow the close striker 51 to move in or out.

Above the plate 12, provided is a support 13 which supports the rotation shaft of the close catch 24, the rotation shafts of the hold open cam 32 and the hold open catch 34, and a close cable 21 and a hold open cable 31 are fixed to.

The front latch part restrains the close striker 51 formed on the vehicle body when the sliding door 2 is closed so that the sliding door 2 keeps the closed state, and releases the restriction of the close striker 51 when the sliding door 2 starts to open. The front latch part may be installed at the front of the plate 12 near the front end of the sliding door 2, and the hold open latch part may be installed to be spaced from the front latch part and positioned at the rear of the vehicle 1 (right side of FIG. 4). Since the front latch part restrains or releases the close striker 51 installed on the vehicle body and the lower roller guiding sliding of the sliding door 2 is installed on the sliding door 2, the front latch part is installed in the front of the hold open latch part. The front latch part and the hold open latch part are installed on one plate 12, which makes it possible to reduce the weight compared to a configuration in which the front latch 111 and the hold open latch 112 are separately provided in the conventional art. Conventional art includes a front latch 111, a hold open latch 112, and a rear latch 113, but in the present disclosure, the front latch portion and the hold open latch portion are mounted on one plate 12, thereby reducing weight. In addition, the degree of freedom in installing the glass in the sliding door 2 is improved, and according to this, assemble performance is improved.

The front latch part may include a close cable 21 which transmits the occupant's operating signal, a close lever 22 which is rotated by the close cable 21, a close catch 24 which grips the close striker 51, and a close pole 23 which operates the close catch 24 when the close lever 22 is rotated.

The close cable 21 may be formed in such a way that a wire is installed inside the tube and is installed so as to be pulled when the operation for opening the sliding door 2 is input from the passenger.

The close lever 22 is installed to be rotatable at one end thereof on the plate 12 and the other end thereof may be connected with the close cable 21. Also, the one end of the close lever 22 may be mounted in an elastically supported state by an elastic member returning the close lever 22 to its original position, so that the close lever 22 can be rotated in the opposite direction pulled by the close cable 21 in the opposite direction. That is, the close lever 22 rotates clockwise (on the basis of FIG. 4) when pulled by the close cable 21 and rotates anticlockwise (on the basis of FIG. 4) by the elastic member when the close cable 21 has been manipulated.

The close catch 24 may be installed to be rotatable on the plate 12. In order to restrict the sliding striker 51 formed in the vehicle body when the sliding door 2 is closed, the close catch 24 has a cutout groove through which the close striker 51 is move in or out, and the close catch 24 may be formed in a U-shape. On the other hand, the plate 12 also may have a cutout groove for entry and exit of the close striker 51 so that the close striker 51 can enter and exit. When the close catch 24 is rotated and the directions of the cutout groove formed in the close catch 24 and the cutout groove formed in the plate 12 correspond to each other, the close striker 51 can enter and exit, so that the restraint of the close striker 51 is released. On the other hand, if the directions of the cutout grooves formed in the close catch 24 and the cutout grooves formed in the plate 12 do not coincide with each other, the close striker 51 cannot enter and exit, so that the sliding door 2 is kept closed.

The close catch 24 is elastically supported on the plate 12 by an elastic member such as a torsion spring, so that the close catch 24 is elastically supported in the direction that the cutout groove formed in the close catch 24 and the cutout groove formed in the plate 12 are aligned. However, with the sliding door 2 closed, the close catch 24 is manipulated so that the directions of the cutout groove formed in the close catch 24 and the cutout groove formed in the plate 12 can be different from each other.

The close pole 23 rotates the close catch 24 upon rotation of the close lever 22. The close pole 23 may be formed so that one end of the close pole 23 is installed to be rotatable on the plate 12 and the other end is in contact with the close catch 24. Also, the close pole 23 may be elastically supported in a direction toward the close catch 24.

The close pole 23 is elastically supported to face the close catch 24, so that the close pole 23 is elastically supported in a direction that prevents rotation of the close catch 24 until the close cable 21 is manipulated. One side of the close pole 23 is held in one side of the close catch 24 to prevent the close catch 24 from rotating so that the sliding door 2 remains closed. Thus, the close catch 24 keeps the close striker 51 in a restrained state, thereby keeping the sliding door 2 closed. Also, a contact protrusion may be formed on the close pole 23 to protrude. The contact protrusion is formed so as to contact with one side of the close lever 22, so that when the close lever 22 rotates, the close pole 23 rotates together. When the close pole 23 rotates, the close pole 23 and the close catch 24 are separated at the other end of the close pole 23, and the close catch 24 is rotated by the elastic member.

The hold open latch part may be installed on the plate 12 so as to be spaced from the front latch part to the rear of the vehicle. When the sliding door 2 is opened, the hold open latch part restrains the sliding of the sliding door 2 and keeps it open. When the sliding door 2 starts to close, the hold open latch part releases the restraint to allow sliding of the sliding door 2. The hold open latch part may include a hold open cable 31 to which an operation signal of a passenger is transmitted, a hold open cam 32 which is rotated by the hold open cable 31, a hold open catch 34 which restrains a hold open striker 52 formed on the lower roller side and a hold open pole 33 for operating the hold open catch 34 when the hold open cam 32 is rotated.

The hold open cable 31 may be formed in such a way that a wire is installed inside the tube, so that the hold open cable 31 is pulled when the operation for closing the sliding door 2 from the passenger is inputted.

The hold open cam 32 is mounted to be rotatable on the plate 12 and connected with the end portion of the hold open cable 31. The hold open cam 32 is supported by an elastic member such as a torsion spring so that it is rotated in an opposite direction to the direction pulled by the hold open cable 31 when the hold open cable 31 is not pulled. A profile is formed in the outer circumference of the hold open cam 32 so that one side thereof is protruded and operates the hold open pole 33.

The hold open catch 34 is installed to be rotatable on the plate 12, through which the hold open striker 52 formed on the lower roller side is penetrated. The hold open catch 34 may be mounted to be rotatable on the plate 12 with the elastic member supported by an elastic member such as a torsion spring. The hold open catch 34 is rotated clockwise (on the basis of FIG. 4) by the elastic member without being constrained by the hold open pole 33. A penetration hole is formed at one side of the hold open catch 34, and the hold open striker 52 penetrates the penetration hole.

The hold open pole 33 may be mounted to be rotatable on the plate 12. The hold open pole 33 may be installed to be rotatable on the plate 12 with being elastically supported, and the hold open pole 33 may be elastically supported to abut the hold open catch 34. That is, one side of the hold open pole 33 always remains in contact with the hold open catch 34.

A protrusion pin 33a contacting the hold open cam 32 may be formed on the hold open pole 33, and a stop protrusion 33b is formed to prevent rotation of the hold open catch 34.

The protrusion pin 33a may be formed to protrude from the hold open pole 33 so that it contacts the circumference of the hold open cam 32 when the hold open cam 32 rotates and the hold open pole 33 rotates in a direction opposite to the hold open cam 32.

At one side of the hold open pole 33 is formed a stop protrusion 33b which restrains the operation of the hold open catch 34.

The hold open catch 34 may be installed to be rotatable on the plate 12.

The hold open catch 34 is installed with the rotation center being elastically supported by the elastic member, so that when the external force is not applied, the hold open catch 34 is supported by the elastic member in order that the roller is rotatable. The hold open catch 34 may be formed to extend to one side with respect to the rotation axis, and a penetration hole through which the hold open striker 52 passes is formed in the extended portion. On the other hand, a stopper 34a may be formed on the opposite side of the hold open catch 34 where the hold open striker 52 is formed. The stopper 34a may be formed so that the circumference of the hold open catch 34 is protruded. The rotation of hold open catch 34 is blocked when the stop protrusion 33b is caught on a portion where the hold open catch 34 and a stepped jaw are formed by the protrusion of the stopper 34a, which restrains the operation of the lower roller, thereby keeping the sliding door 2 open.

The rear end of the sliding door 2 may be provided with a rear latch 41 which maintains the close of the sliding door 2 between the rear end of the sliding door 2 and the vehicle body of the vehicle 1.

The sliding door 2 also may have a remote controller 42 for operating the close cable 21 and the hold open cable 31 when the occupant manipulates the inside handle or the outside handle.

The configuration and operation of the rear latch 41 and the remote controller 42 are the same as those of a conventional rear latch, so detailed description will be omitted.

Hereinafter, an operation of an integrated door latch assembly of a sliding door according to the present disclosure will be described.

When the sliding door 2 is closed, the close catch 24 restrains the close striker 51 mounted on the vehicle body so that the sliding door 2 remains closed.

First, a state in which the sliding door 2 is opened in a closed state will be described. To open the sliding door 2, the occupant manipulates the inside handle or the outside handle. When the inside handle or the outside handle is manipulated, the close cable 21 of the integrated door latch assembly is pulled from the remote controller 42 installed on the sliding door 2 so that the close catch 24 releases the close striker 51 and the front of the sliding door 2 is released from the vehicle body.

Figure 6:
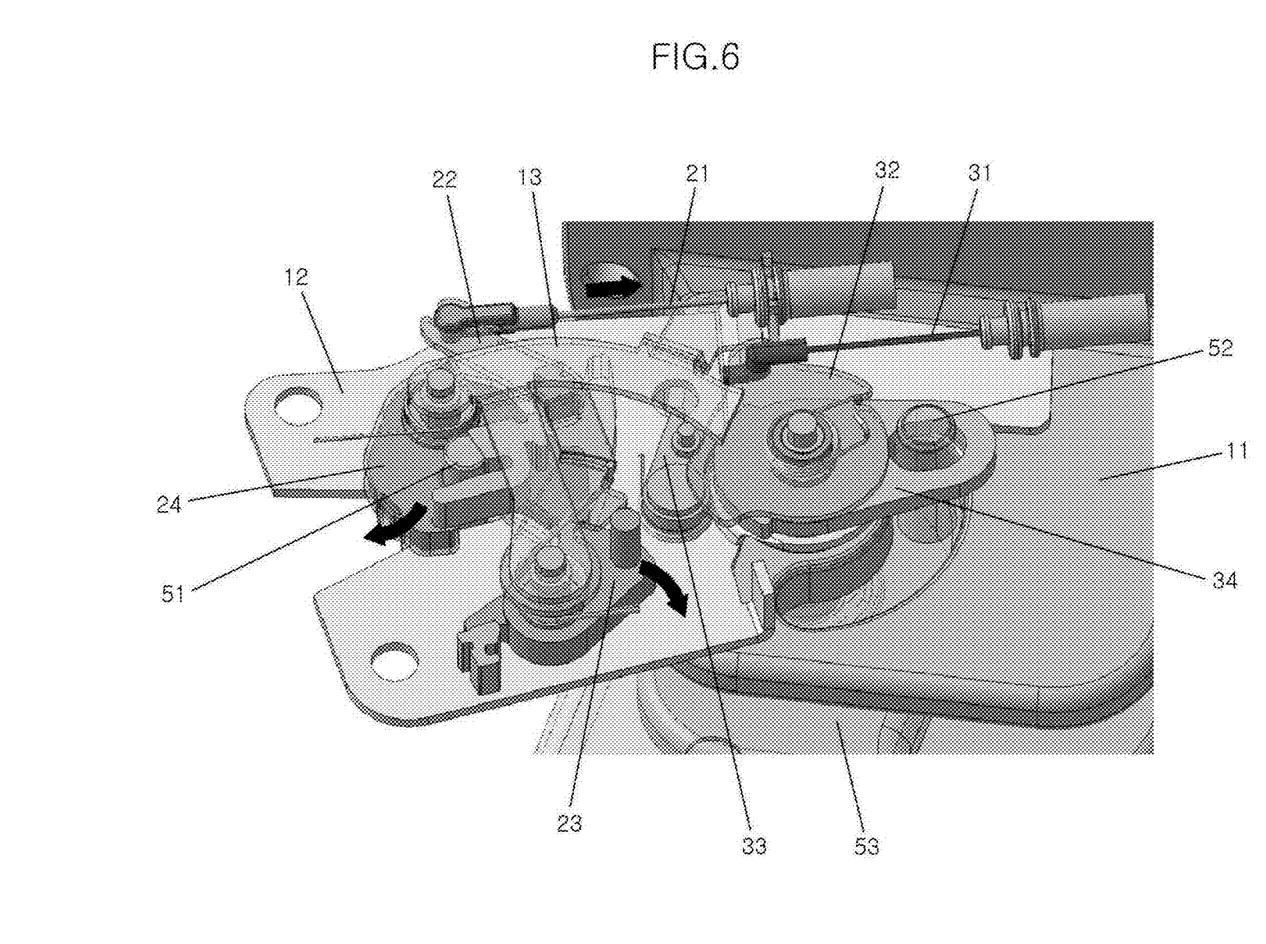
FIG. 6 is a perspective view showing an operating state of the integral door latch assembly of the sliding door according to the present invention when the door is opened from the closed state of the door.

That is, as shown in FIG. 6, when the close cable 21 is pulled, the close lever 22 rotates clockwise, and presses the close pole 23 to rotate the close pole 23 clockwise.

When the close pole 23 rotates, the close catch 24, which was restricted to rotation by the close pole 23, is rotated clockwise by the elastic force of the elastic member and passes through the opened portions of the open portion of the close catch 24 and the open portion of the plate 12 to be aligned, so that the close striker 51 constrained to the close catch 24 can be separated.

Thus, when the close cable 21 is pulled, the close catch 24 ultimately releases the constraint of the close striker 51, thereby opening the front end of the sliding door 2.

On the other hand, when the inside handle or the outside handle is manipulated, the rear latch 41 is also released, allowing the rear end of the sliding door 2 to open.

Thus, once the sliding door 2 is unrestrained in the integrated door latch assembly and the rear latch 41, the occupant can open the sliding door 2 by pushing the sliding door 2.

Figure 5:
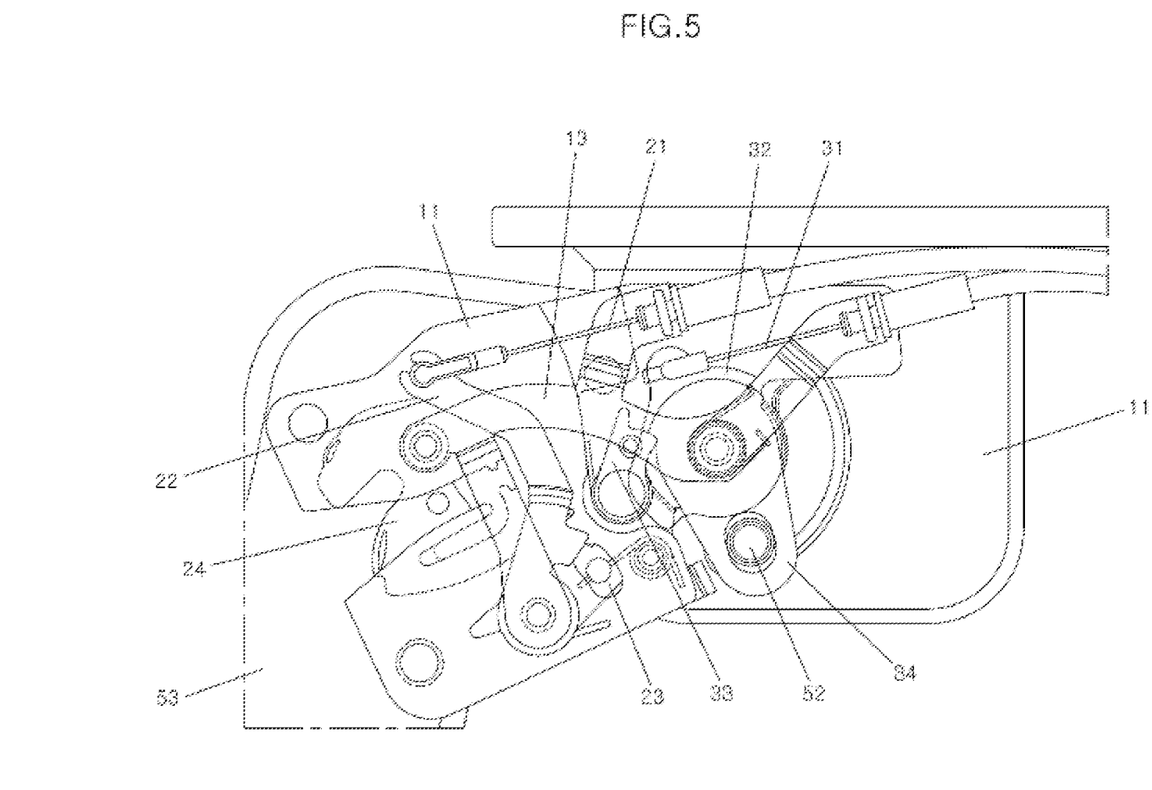
FIG. 5 is a plan view showing an integrated door latch assembly of a sliding door according to the present disclosure at the time of door opening.

When the sliding door 2 is fully opened, the hold open catch 34 restrains the hold open striker 52 and the sliding door 2 remains open. By keeping the sliding door 2 open, it is easy to get on or off the passenger. When the sliding door 2 is fully opened, the hold open pole 33 prevents the hold open catch 34 from rotating so that the sliding door 2 remains open.

When the occupant closes the sliding door 2, the hold open catch 34 releases the restraint of the hold open striker 52 so that the sliding door 2 can move from the open state to the closed state.

Figure 7:
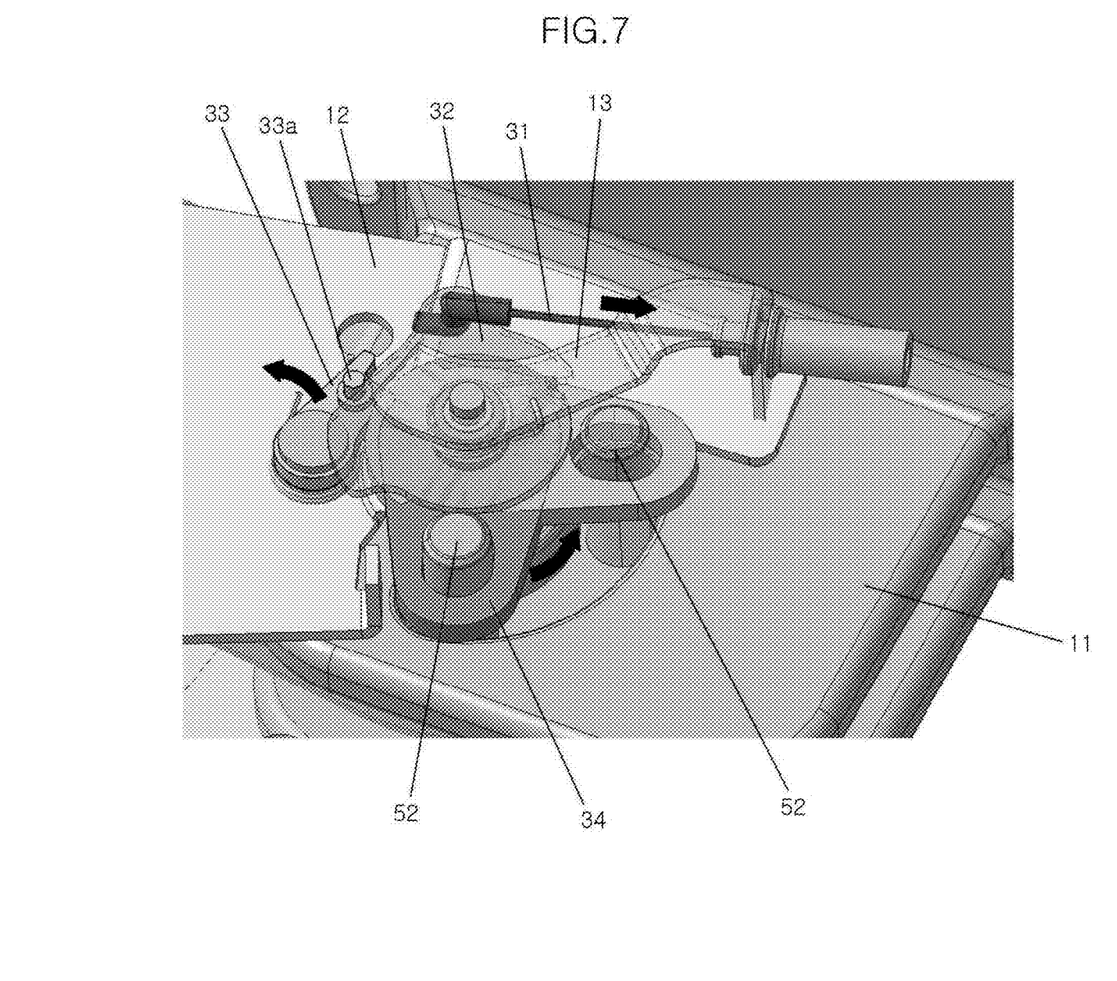
FIG. 7 is a perspective view showing an operating state of the integral door latch assembly of the sliding door according to the present invention when the door is closed from the opened state of the door.

As shown in FIG. 7, when the sliding door 2 starts to be closed, the hold open cable 31 is pulled. When the hold open cable 31 is pulled, the hold open cam 32 rotates clockwise. When the hold open cam 32 is rotated, the hold open pole 33 rotates in an opposite direction with respect to the hold open cam 32. When the hold open pole 33 rotates, the hold open catch 34 rotates and the hold open striker 52 rotates to close the sliding door 2.

Figure 8:
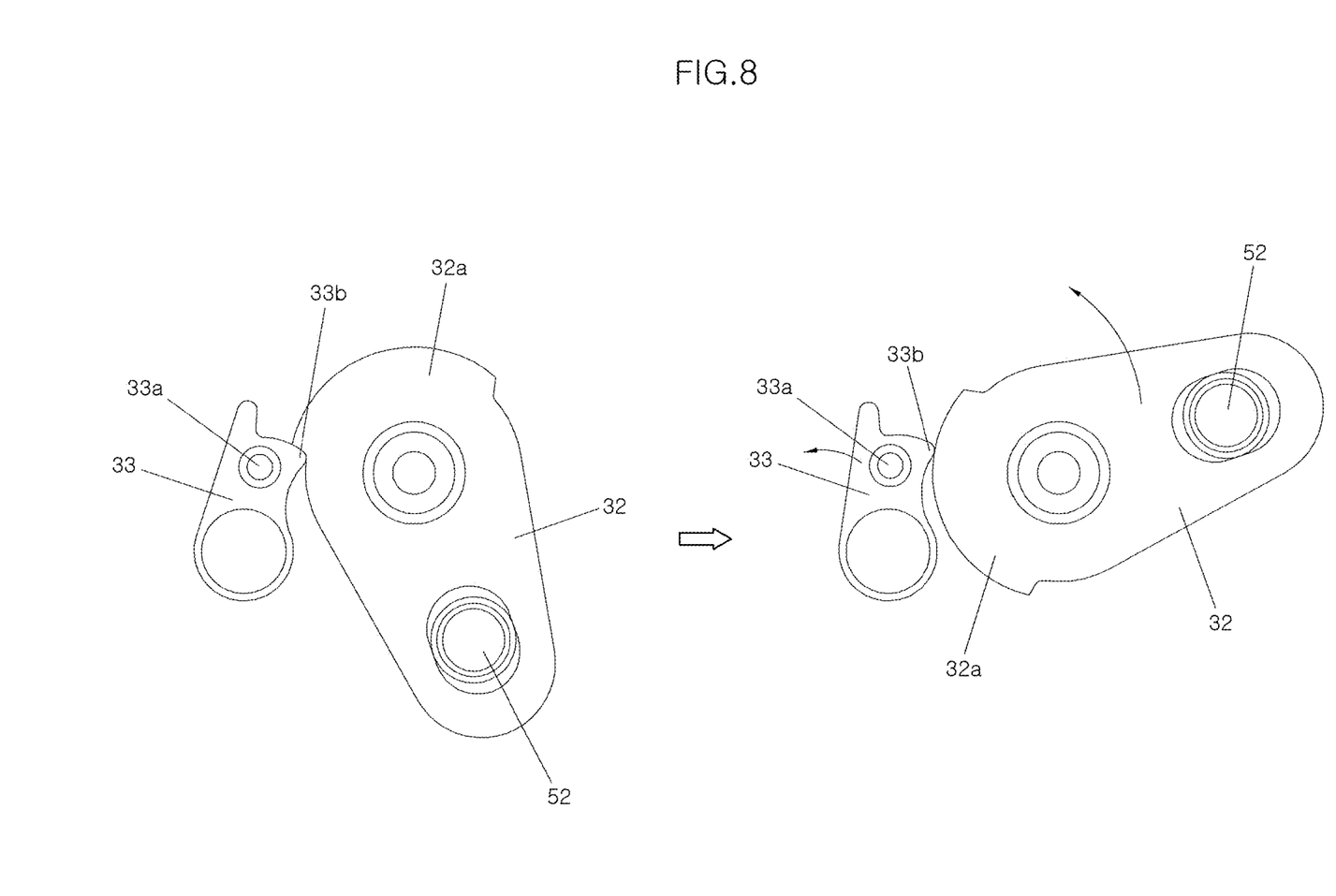
FIG. 8 is a plan view showing the operation relationship between the hold open cam and the hold open pole in an integrated door latch assembly of a sliding door according to the present disclosure.

This is shown in FIG. 8, it is as follows. In the state that the sliding door 2 is opened (left side of FIG. 8), the stop protrusion 33b of the hold open pole 33 restrains the stopper 34a of the hold open catch 34, so that the rotation of the hold open catch 34 is restrained and the hold open catch 34 restrains the hold open striker 52, thereby keeping the sliding door 2 open. On the other hand, when the closing or the sliding door 2 is started (right side of FIG. 8), the hold open cam 32 rotates and the hold open cam 32 pushes the protrusion pin 33a of the hold open pole 33 to rotate the hold open pole 33. When the hold open pole 33 is rotated, the stop protrusion 33b is spaced from the stopper 34a. When the restraint of the hold open catch 34 by the hold open pole 33 is released, the hold open catch 34 rotates by the elastic member such as a spring and restraint of the hold open striker 52 is released, thereby closing the sliding door 2 from the opened state.

What is claimed is:

1. An integrated door latch assembly, which is mounted on a sliding door that is slidably installed on a side surface of a vehicle to maintain an open state and a closed state of the sliding door, the integrated door latch assembly comprising:
   a plate installed at a lower front portion of the sliding door;
   a front latch part installed in a front portion of the plate, the front latch part configured to maintain the closed state of the sliding door by restricting a close striker formed at a vehicle body of the vehicle when the sliding door is in the closed state and to release the restriction of the close striker to allow the sliding door to slide to the open state; and
   a hold open latch part installed at the plate and spaced apart from the front latch part to a rear of the vehicle, the hold open latch part configured to maintain the open state of the sliding door by restricting sliding of the sliding door when the sliding door is in the open state and to release the restriction of the sliding door, so that the sliding of the sliding door to the closed state is possible;
   wherein a cutout groove is formed in the plate and wherein the close striker enters and exits through the cutout groove, and
   wherein the front latch part comprises:
      a close lever installed on the plate to be rotated when a close cable is pulled by operation of a user;
      a close catch formed with a cutout groove of a "U"-shape in which the close striker can enter and exit, the close catch installed to be rotatable on the plate; and
      a close pole configured to allow the close catch to be rotated when the close lever is rotated so that the cutout groove of the close catch and the cutout groove of the plate are aligned.

2. The integrated door latch assembly of claim 1, wherein the plate is installed at the lower front portion of the sliding door by being fastened to a lower bracket installed at an upper surface of the lower front portion of the sliding door, wherein the upper surface is parallel to the ground and the lower bracket is bent so as to be parallel to the ground.

3. The integrated door latch assembly of claim 1, wherein:
the close lever is elastically supported in a direction opposite to a direction of the rotation of the close lever when the close cable is pulled by the operation of a user;
the close catch is elastically supported in a direction such that the cutout groove, formed in the plate, and the cutout groove, formed in the close catch, are aligned; and
the close pole is elastically supported in a direction such that the close pole blocks rotation of the close catch.

4. The integrated door latch assembly of claim 1, wherein the close lever is elastically supported in a direction opposite to a direction of the rotation of the close lever when the close cable is pulled by the operation of a user.

5. The integrated door latch assembly of claim 1, wherein the close catch is elastically supported in a direction such that the cutout groove, formed in the plate, and the cutout groove, formed in the close catch, are aligned.

6. The integrated door latch assembly of claim 1, wherein the close pole is elastically supported in a direction such that the close pole blocks rotation of the close catch.

7. A vehicle comprising:
a vehicle body;
a sliding door that is slidably installed on a side surface of the vehicle body, the sliding door able to be maintained in an open state and a closed state;
a plate installed at a lower front portion of the sliding door, wherein the plate includes a cutout groove;
a close striker formed at the vehicle body, wherein the close striker enters and exits through the cutout groove;
a front latch part installed in a front portion of the plate, the front latch part configured to maintain the closed state of the sliding door by restricting the close striker when the sliding door is in the closed state and to release the restriction of the close striker allowing the sliding door to slide to the open state;
a hold open latch part installed at the plate and spaced apart from the front latch part in a direction of a rear of the vehicle, the hold open latch part configured to maintain the open state of the sliding door by restricting the sliding of the sliding door when the sliding door is in the open state and to release the restriction so that the sliding door can slide to the closed state; and
a close cable and a hold open cable configured to assist a user in releasing the restriction of the sliding door in the closed state and the open state, respectively.

8. The vehicle of claim 7, further comprising a lower bracket bent from the sliding door to be parallel to the ground and installed at an upper surface of the lower front portion, wherein the plate is fastened to a lower front portion of the sliding door by the lower bracket and the upper surface is parallel to the ground.

9. The vehicle of claim 7, wherein the front latch part comprises:
a close lever installed on the plate to be rotated when the close cable is pulled by operation of the user;
a close catch formed with a cutout groove of a "U"-shape in which the close striker can enter and exit, the close catch installed to be rotatable on the plate; and
a close pole configured to rotate the close catch when the close lever is rotated so that the cutout groove of the close catch and the cutout groove of the plate are aligned.

10. The vehicle of claim 9, wherein:
the close lever is elastically supported in a direction opposite to a direction of the rotation of the close lever when the close cable is manipulated by a user;
the close catch is elastically supported in a direction such that the cutout groove, formed in the plate, and the cutout groove, formed in the close catch, are aligned; and
the close pole is elastically supported in a direction such that the close pole blocks rotation of the close catch.

11. An integrated door latch assembly, which is mounted on a sliding door that is slidably installed on a side surface of a vehicle to maintain an open state and a closed state of the sliding door, the integrated door latch assembly comprising:
a plate installed at a lower front portion of the sliding door;
a front latch part installed in a front portion of the plate, the front latch part configured to maintain the closed state of the sliding door by restricting a close striker formed at a vehicle body of the vehicle when the sliding door is in the closed state and to release the restriction of the close striker to allow the sliding door to slide to the open state; and
a hold open latch part installed at the plate and spaced apart from the front latch part to a rear of the vehicle, the hold open latch part configured to maintain the open state of the sliding door by restricting sliding of the sliding door when the sliding door is in the open state and to release the restriction of the sliding door, so that the sliding of the sliding door to the closed state is possible;
wherein a cutout groove is formed in the plate and wherein the close striker enters and exits through the cutout groove;
wherein the front latch part comprises:
a close lever installed on the plate to be rotated when a close cable is pulled by operation of a user;
a close catch formed with a cutout groove of a "U"-shape in which the close striker can enter and exit, the close catch installed to be rotatable on the plate; and
a close pole configured to allow the close catch to be rotated when the close lever is rotated so that the cutout groove of the close catch and the cutout groove of the plate are aligned;
wherein the plate is installed at the lower front portion of the sliding door by being fastened to a lower bracket installed at an upper surface of the lower front portion of the sliding door, wherein the upper surface is parallel to the ground and the lower bracket is bent so as to be parallel to the ground;
wherein the close lever is elastically supported in a direction opposite to a direction of the rotation of the close lever when the close cable is pulled by the operation of a user;
wherein the close catch is elastically supported in a direction such that the cutout groove, formed in the plate, and the cutout groove, formed in the close catch, are aligned; and
wherein the close pole is elastically supported in a direction such that the close pole blocks rotation of the close catch.

* * * * *